(12) United States Patent
Koike

(10) Patent No.: US 9,812,697 B2
(45) Date of Patent: Nov. 7, 2017

(54) MANUFACTURING METHOD OF LAMINATED ELECTRODE BODY

(71) Applicant: TOYOTA JIDOSHA KABUSHIKI KAISHA, Toyota-shi, Aichi-ken (JP)

(72) Inventor: Masaki Koike, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/258,390

(22) Filed: Sep. 7, 2016

(65) Prior Publication Data

US 2017/0069905 A1   Mar. 9, 2017

(30) Foreign Application Priority Data

Sep. 7, 2015 (JP) ................................. 2015-175502

(51) Int. Cl.
| | |
|---|---|
| B32B 41/00 | (2006.01) |
| H01M 4/04 | (2006.01) |
| H01M 2/16 | (2006.01) |
| H01M 2/14 | (2006.01) |
| B32B 38/18 | (2006.01) |

(Continued)

(52) U.S. Cl.
CPC ............ H01M 4/043 (2013.01); B32B 7/02 (2013.01); B32B 38/0004 (2013.01); B32B 38/18 (2013.01); H01M 2/145 (2013.01); H01M 2/1673 (2013.01); B32B 37/0053 (2013.01); B32B 37/02 (2013.01); B32B 37/10 (2013.01); B32B 37/18 (2013.01); B32B 37/187 (2013.01); B32B 37/22 (2013.01); B32B 2309/14 (2013.01); B32B 2309/72 (2013.01); B32B 2457/10 (2013.01); H01M 2004/027 (2013.01); H01M 2004/028 (2013.01)

(58) Field of Classification Search
CPC .............. H01L 21/6835; H01L 21/302; H01L 2221/6834; H01L 2221/68327; H01L 2221/68318; H01L 2221/68381; H01L 22/12; B32B 7/06; B32B 9/04; B32B 7/12; B32B 17/06; B32B 2457/14
USPC .......................... 156/64, 350, 351, 378, 379
See application file for complete search history.

(56) References Cited

U.S. PATENT DOCUMENTS

2015/0333361 A1* 11/2015 Sato .................. H01M 10/0404
29/623.1

FOREIGN PATENT DOCUMENTS

| | | |
|---|---|---|
| JP | 2012-226910 A | 11/2012 |
| WO | WO 2014061119 A1 * | 4/2014 ........ H01M 10/0404 |

* cited by examiner

Primary Examiner — Michael N Orlando
Assistant Examiner — Joshel Rivera
(74) Attorney, Agent, or Firm — Sughrue Mion, PLLC

(57) ABSTRACT

A positive-electrode belt-shaped sheet is cut while the positive-electrode belt-shaped sheet and a negative-electrode belt-shaped sheet are continuously sent, a cut positive-electrode sheet laminated on the uncut negative-electrode belt-shaped sheet via a separator layer is sent and clamped, the uncut negative-electrode belt-shaped sheet is cut at a cutting gap between the positive-electrode sheets laminated thereon, so as to form a sheet unit including the positive-electrode sheet and the negative-electrode sheet, a lamination shape of the sheet unit is measured so as to determine good or bad of the lamination shape, the sheet unit is classified based on a good/bad determination result, and the sheet units determined as good products is collectively laminated and pressed so as to obtain a laminated electrode body. Here, the positive-electrode belt-shaped sheet is cut while the positive-electrode belt-shaped sheet is clamped.

3 Claims, 10 Drawing Sheets

(51) Int. Cl.
*B32B 7/02* (2006.01)
*B32B 38/00* (2006.01)
*B32B 37/10* (2006.01)
*B32B 37/00* (2006.01)
*H01M 4/02* (2006.01)
*B32B 37/02* (2006.01)
*B32B 37/18* (2006.01)
*B32B 37/22* (2006.01)

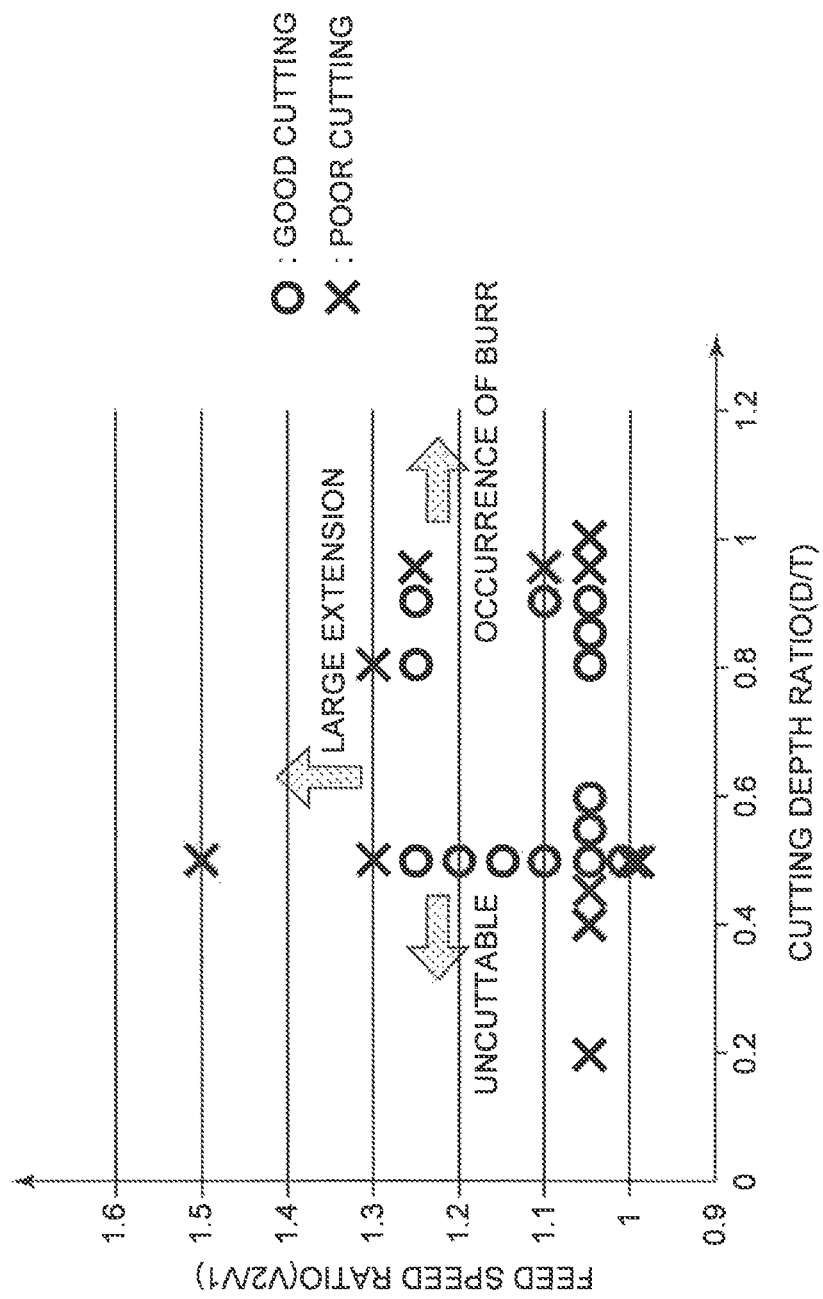

MANUFACTURING METHOD OF LAMINATED ELECTRODE BODY

INCORPORATION BY REFERENCE

The disclosure of Japanese Patent Application No. 2015-175502 filed on Sep. 7, 2015 including the specification, drawings and abstract is incorporated herein by reference in its entirety.

BACKGROUND

1. Technical Field

The present disclosure relates to a manufacturing method of a laminated electrode body configured such that a positive-electrode sheet, a separator layer, and a negative-electrode sheet are laminated in several layers.

2. Description of Related Art

As this type of technique, there has been conventionally known a technique described in Japanese Patent Application Publication No. 2012-226910 (JP 2012-226910 A). This technique relates to a manufacturing method of a secondary battery, and includes: a zigzag-folding step of folding a separator in a zigzag manner by pressing the separator having a long belt shape by a plurality of guide members; a laminated-body forming step of forming a laminated body by alternately inserting sheet-shaped positive plates and negative plates into respective valley grooves of the separator thus folded in a zigzag manner, so that the positive plates and the negative plates are alternately laminated via the separator; a removal step of removing the guide members from the respective valley grooves of the separator; and a pressing step of pressing the laminated body in a direction where the positive plates and the negative plates are laminated. The zigzag-folding step is performed after the separator is set to a tension-free state. Hereby, the laminated electrode body in which the positive plate, the separator, and the negative plate are laminated in several layers is manufactured, and the laminated electrode body thus manufactured is accommodated in a rectangular case, so that a battery is manufactured.

However, in the manufacturing method described in JP 2012-226910 A, the zigzag-folding step includes sub steps of drawing of the separator, zigzag folding, taking-out, positioning, and insertion of the positive plates and the negative plates, and the like. This requires a long time and working efficiency is not good. Further, an apparatus that performs this manufacturing method requires respective devices for performing the zigzag-folding step, the laminated-body forming step, the removal step, and the insertion step, respectively, so the whole apparatus tends to upsize. Further, a device for punching out, in a short-strip shape, a long belt-shaped electrode wound in a roll shape so as to form sheet-shaped positive plates and negative plates in another step is required. This further requires a machining time, which causes such a problem that the whole apparatus is further upsized.

SUMMARY

This disclosure provides a manufacturing method of a laminated electrode body, and the manufacturing method can efficiently laminate a positive-electrode sheet and a negative-electrode sheet with a separator layer being provided therebetween and can shorten a manufacturing time of a laminated electrode body.

A first aspect of the present disclosure relates to a manufacturing method of a laminated electrode body, comprising: forming a separator layer on an electrode surface of at least one of a positive-electrode belt-shaped sheet and a negative-electrode belt-shaped sheet; cutting either one of the positive-electrode belt-shaped sheet and the negative-electrode belt-shaped sheet so as to form a positive-electrode sheet or negative-electrode sheet while continuously sending the either one of the positive-electrode belt-shaped sheet and the negative-electrode belt-shaped sheet by a feed roller; clamping and sending, by a clamp roller, the formed positive-electrode sheet or the formed negative-electrode sheet laminated, via the separator layer, on the other one of the negative-electrode belt-shaped sheet and the positive-electrode belt-shaped sheet, the other one of the negative-electrode belt-shaped sheet and the positive-electrode belt-shaped sheet being uncut; cutting the other one of the negative-electrode belt-shaped sheet and the positive-electrode belt-shaped sheet at a cutting gap between the positive-electrode sheets or negative-electrode sheets laminated on the other one of the negative-electrode belt-shaped sheet and the positive-electrode belt-shaped sheet, so as to obtain a sheet unit including the positive-electrode sheet and the negative-electrode sheet; measuring a lamination shape of the sheet unit so as to determine good or bad of the lamination shape; classifying the sheet unit into a good product when it is determined that the lamination shape of the sheet unit is good and classifying the sheet unit into a defective product when it is determined that the lamination shape of the sheet unit is bad; and laminating and pressing a plurality of sheet units determined as the good product, so as to obtain a laminated electrode body. The either one of the positive-electrode belt-shaped sheet and the negative-electrode belt-shaped sheet is cut while the either one of the positive-electrode belt-shaped sheet and the negative-electrode belt-shaped sheet is clamped.

According to the configuration of the embodiment, at least one of the positive-electrode belt-shaped sheet and the negative-electrode belt-shaped sheet is integrated with the separator layer in advance. Accordingly, at the time of laminating the positive-electrode sheet and the negative-electrode sheet, alignment of the positive-electrode sheet and the negative-electrode sheet with the separator layer is not required. Further, the sending of the positive-electrode belt-shaped sheet and the negative-electrode belt-shaped sheet, the cutting of the positive-electrode belt-shaped sheet, the clamping of the negative-electrode belt-shaped sheet or positive-electrode belt-shaped sheet to be cut and the uncut negative-electrode belt-shaped sheet or positive-electrode belt-shaped sheet, the cutting of the uncut negative-electrode belt-shaped sheet or positive-electrode belt-shaped sheet, and the laminating of the sheet units are continuously performed without acceleration or deceleration.

As such, it is possible to efficiently laminate the positive-electrode sheet and the negative-electrode sheet with the separator layer being provided therebetween, thereby making it possible to shorten a manufacturing time of the laminated electrode body.

The either one of the positive-electrode belt-shaped sheet and the negative-electrode belt-shaped sheet may be cut by a cutting blade provided in the feed roller; and when a first feed speed by the feed roller is indicated by V1 and a second feed speed by the clamp roller may be indicated by V2, V1 and V2 satisfy a relationship represented by the following Formula (1) as follows $$1 < V2/V1 \leq 1.25 \quad (1)$$

Since the first feed speed V1 by the feed roller and the second feed speed V2 by the clamp roller satisfy the relationship of Formula (1), the cutting is performed while a pulling force in a feed direction of the positive-electrode belt-shaped sheet is applied to a cut part of the positive-electrode belt-shaped sheet due to the speed difference between the first feed speed V1 and the second feed speed V2.

The clamp roller may include first and second rollers making contact with each other, a cut portion axially extending may be formed on an outer periphery of the first roller, and at the time of a rotation of the clamp roller, the clamp roller may temporarily cause an unclamped state by the cut portion of the first roller, so as to absorb a speed difference between the first feed speed and the second feed speed.

On a cutting surface of the positive-electrode belt-shaped sheet, it is possible to restrain an occurrence of burr in its thickness direction.

At the time of a rotation of the clamp roller, the clamp roller temporarily causes an unclamped state by the cut portion of the first roller so as to absorb the speed difference between the first feed speed and the second feed speed. Accordingly, the speed difference does not cause an adverse effect on the sending and the cutting of the positive-electrode belt-shaped sheet.

Accordingly, it is possible to restrain a malfunction caused due to the speed difference between the first feed speed and the second feed speed, e.g., an occurrence of wrinkles in the positive-electrode sheet at the time of sending and cutting the positive-electrode belt-shaped sheet.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 14 is a graph showing a relationship between a cutting depth ratio and a feed speed ratio in terms of good/bad determination on the positive-electrode belt-shaped sheet, according to one embodiment.

DETAILED DESCRIPTION OF EMBODIMENTS

The following describes one embodiment that embodies a manufacturing method of a laminated electrode body according to the present disclosure in detail with reference to the drawings.

Figure 1:
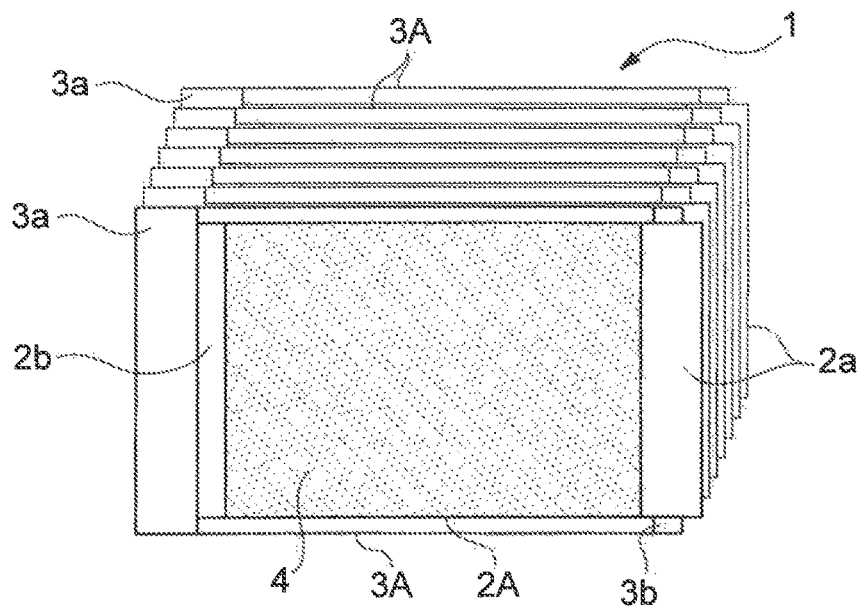
FIG. 1 is a perspective view schematically illustrating a laminated electrode body according to one embodiment.
Figure 2:
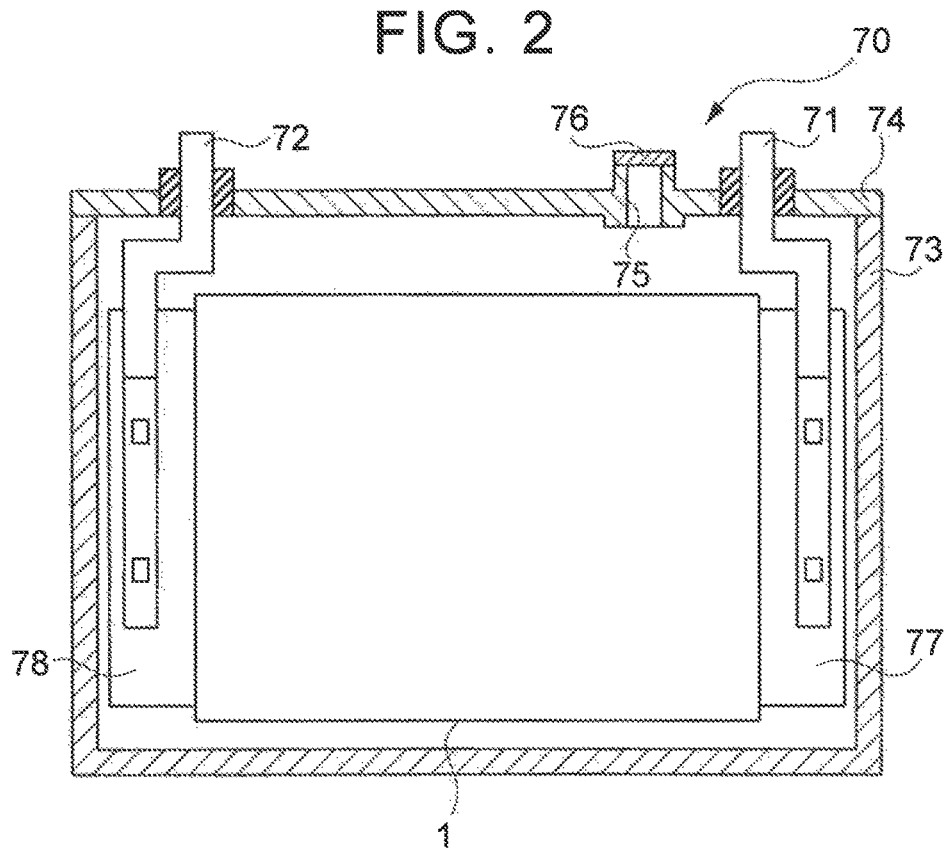
FIG. 2 is a sectional view illustrating a battery including the laminated electrode body according to one embodiment.

FIG. 1 is a perspective view schematically illustrating a laminated electrode body 1 according to the embodiment. FIG. 2 is a sectional view illustrating a battery 70 including the laminated electrode body 1. As illustrated in FIG. 1, the laminated electrode body 1 includes a plurality of positive-electrode sheets 2A and a plurality of negative-electrode sheets 3A that are laminated alternately. The positive-electrode sheets 2A and the negative-electrode sheets 3A are laminated alternately with separator layers 4 being provided therebetween, and are compressed in a flat state. The positive-electrode sheet 2A includes an exposed portion 2a provided on one side edge and an insulation portion 2b provided on an opposite side (the other side edge) to the exposed portion 2a. Similarly, the negative-electrode sheet 3A includes an exposed portion 3a provided on one side edge and an insulation portion 3b provided on an opposite side (the other side edge) to the exposed portion 3a.

As illustrated in FIG. 2, the battery 70 has a flat box shape, and is configured as a secondary battery that performs charging and discharging through a positive terminal 71 and a negative terminal 72 provided on a top face thereof. As the battery 70, a lithium-ion secondary battery and a nickel-hydrogen battery can be exemplified. The battery 70 includes a rectangular case 73, and a cover plate 74 that closes an opening of the rectangular case 73. The case 73 and the cover plate 74 are made of aluminum. The laminated electrode body 1, an electrolyte (not shown), and so on are accommodated in the case 73. The positive terminal 71 and the negative terminal 72 are provided in the cover plate 74. The cover plate 74 is provided with a seal member 76 for sealing an injection opening 75 through which the electrolyte is poured into the case 73.

In order to manufacture the battery 70, the exposed portions 2a, 3a are bundled up to so as to form a positive electrode lead 77 and a negative electrode lead 78 in the laminated electrode body 1. Subsequently, a lower end of the positive terminal 71 and a lower end of the negative terminal 72 are electrically connected to the positive electrode lead 77 and the negative electrode lead 78, respectively. The positive terminal 71 and the negative terminal 72 are provided in the cover plate 74. After that, the laminated electrode body 1 is accommodated in the case 73, and the cover plate 74 is put on the opening of the case 73 so as to be fixed thereto. After that, the electrolyte is injected through the injection opening 75 and the injection opening 75 is sealed by the seal member 76. Thus, the battery 70 can be obtained.

Figure 3:
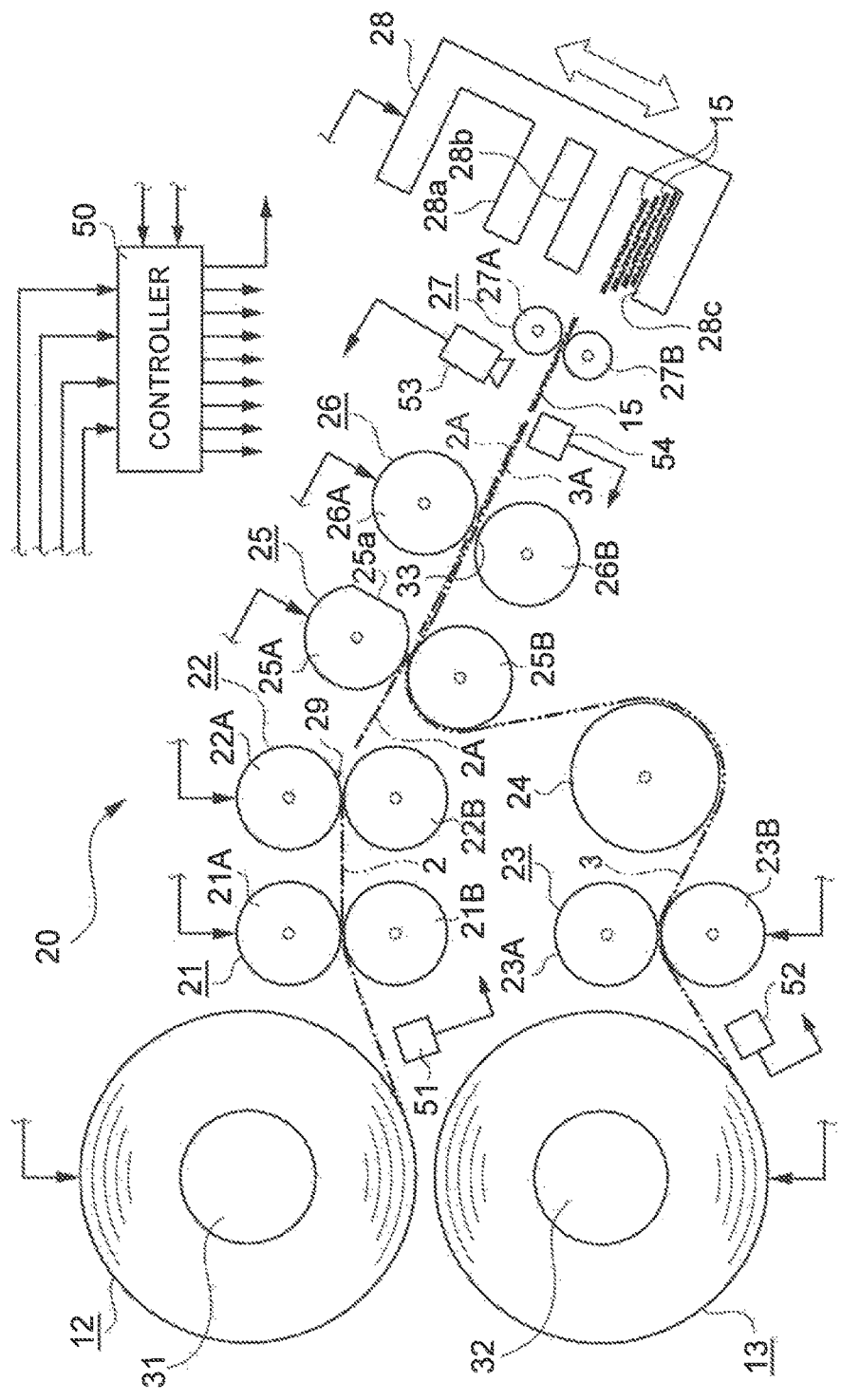
FIG. 3 is a schematic view illustrating a manufacturing apparatus used for manufacture of the laminated electrode body, according to one embodiment.
Figure 4:
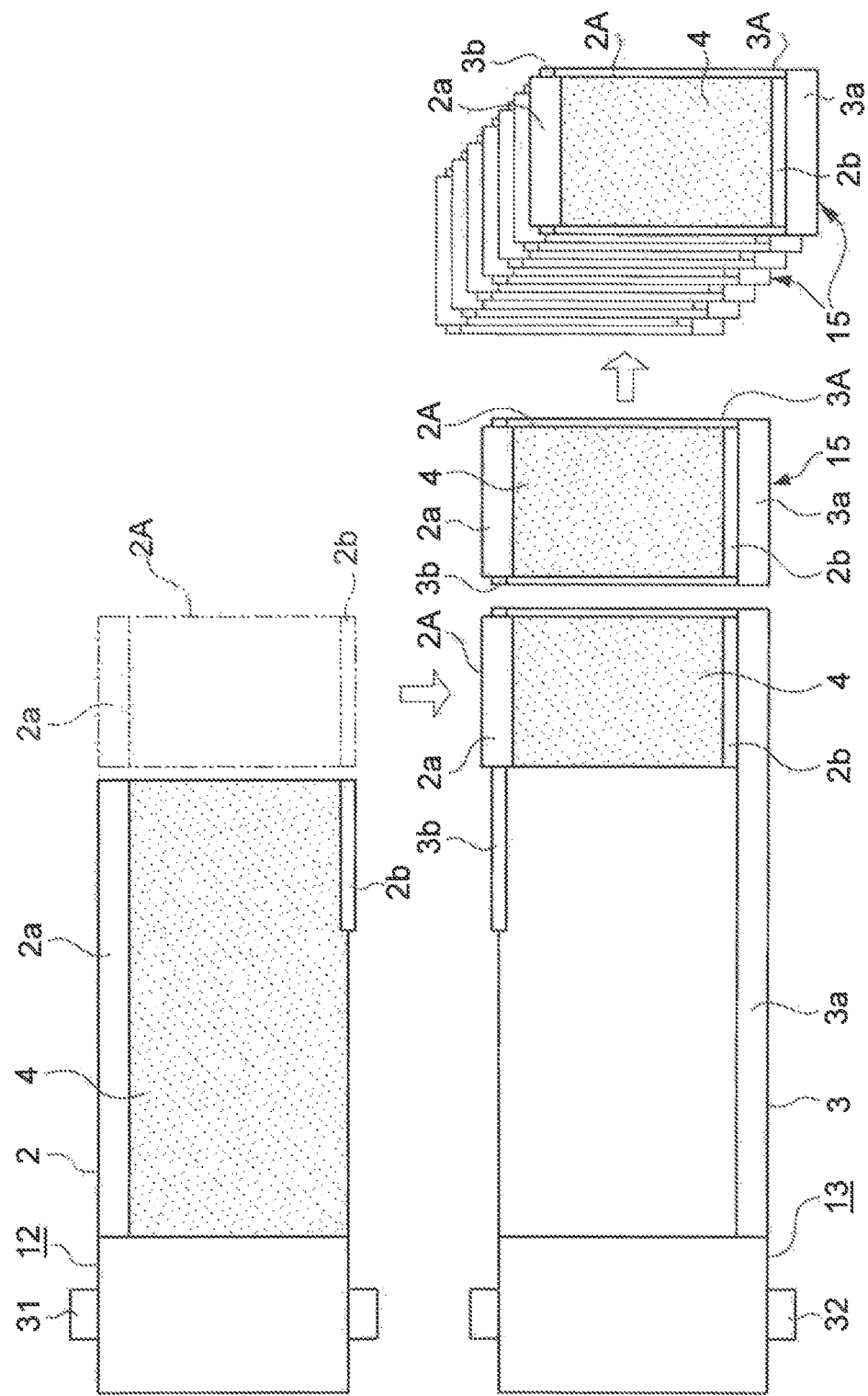
FIG. 4 is a schematic view illustrating a positive-electrode belt-shaped sheet, a negative-electrode belt-shaped sheet, and so on to be machined by the manufacturing apparatus, according to one embodiment.

Next will be described a manufacturing method of the laminated electrode body 1. FIG. 3 is a schematic view illustrating a manufacturing apparatus 20 used for the manufacture of the laminated electrode body 1. FIG. 4 is a schematic view illustrating a positive-electrode belt-shaped sheet 2, a negative-electrode belt-shaped sheet 3, and so on to be machined by the manufacturing apparatus 20.

The manufacturing apparatus 20 includes: a positive-electrode roll 12 around which the long positive-electrode belt-shaped sheet 2 is wound; a negative-electrode roll 13 around which the long negative-electrode belt-shaped sheet 3 is wound; a first feed roller 21 configured to send, in a drawing direction, the positive-electrode belt-shaped sheet 2 drawn out from the positive-electrode roll 12; a first cutting roller 22 configured to send, further forward, the positive-electrode belt-shaped sheet 2 thus sent from the first feed roller 21, the first cutting roller 22 having a cutting function; a second feed roller 23 configured to send, in a drawing direction, the negative-electrode belt-shaped sheet 3 drawn out from the negative-electrode roll 13; a guide roller 24 configured to guide, forward, the negative-electrode belt-shaped sheet 3 thus sent from the second feed roller 23 while changing a direction; a clamp roller 25 configured to perform clamping while intermittently attaching a positive-electrode sheet 2A cut and sent by the first cutting roller 22 onto an electrode surface of the negative-electrode belt-shaped sheet 3 guided by the guide roller 24 with the separator layer 4 being provided therebetween; a second cutting roller 26 configured to send, further forward, the negative-electrode belt-shaped sheet 3 sent from the clamp roller 25 with the positive-electrode sheet 2A being attached thereon, the second cutting roller 26 having a cutting function; a third feed roller 27 configured to send, further forward, a sheet unit 15 sent from the second cutting roller 26 and including a negative-electrode sheet 3A and the positive-electrode sheet 2A; and a housing rack 28 in which to pile up and accommodate sheet units 15 sent from the third feed roller 27. Here, the first feed roller 21, the first cutting roller 22, the second feed roller 23, the second cutting roller 26, and the third feed roller 27 can be regarded as respective feed rollers in the present disclosure.

As illustrated in FIG. 3, in the positive-electrode roll 12, the long positive-electrode belt-shaped sheet 2 is wound around a first winding shaft 31. The first winding shaft 31 is configured to be movable in a vertical direction to a plane of paper of FIG. 3 and to be driven by a motor (not shown). As illustrated in FIG. 4, the separator layer 4 is formed in advance on an electrode surface of the positive-electrode belt-shaped sheet 2. A separator-layer forming step of forming the separator layer 4 on the positive-electrode belt-shaped sheet 2 is performed by use of a device (not shown) different from the manufacturing apparatus 20. The separator layer 4 is a layer having an ion permeability, an insulating property, a shutdown function, and a fusing property. An edge of the positive-electrode belt-shaped sheet 2 is the exposed portion 2a where an electrode is continuously exposed.

As illustrated in FIG. 3, in the negative-electrode roll 13, the negative-electrode belt-shaped sheet 3 is wound around a second winding shaft 32. The second winding shaft 32 is configured to be movable in the vertical direction to the plane of paper of FIG. 3 and to be driven by a motor (not shown). As illustrated in FIG. 4, the separator layer 4 is not formed on the electrode surface of the negative-electrode belt-shaped sheet 3. An edge of the negative-electrode belt-shaped sheet 3 is the exposed portion 3a where an electrode is continuously exposed. The exposed portion 2a of the positive-electrode belt-shaped sheet 2 and the exposed portion 3a of the negative-electrode belt-shaped sheet 3 are provided on a side edge of the positive-electrode belt-shaped sheet 2 and a side edge of the negative-electrode belt-shaped sheet 3, respectively, such that the exposed portion 2a and the exposed portion 3a are placed on opposite sides to each other. That is, in FIG. 4, the exposed portion 2a is formed on an upper-side edge of the positive-electrode belt-shaped sheet 2, and the exposed portion 3a is formed on a lower-side edge of the negative-electrode belt-shaped sheet 3. This is to place the exposed portions 2a, 3a of the sheets 2A, 3A on opposite sides to each other when the positive-electrode sheet 2A and the negative-electrode sheet 3A are put on top of one another, as will be described later.

As illustrated in FIG. 3, the first feed roller 21 includes a pair of rollers 21A, 21B and is driven by a motor (not shown). The first feed roller 21 has a machining function to form the insulation portion 2b for short-circuit prevention along an edge (an edge on the other side to the exposed portion 2a) of the positive-electrode belt-shaped sheet 2 as illustrated in FIG. 4.

As illustrated in FIG. 3, the second feed roller 23 includes a pair of rollers 23A, 23B and is driven by a motor (not shown). The second feed roller 23 has a machining function to form the insulation portion 3b for short-circuit prevention along an edge (an edge on the other side to the exposed portion 3a) of the negative-electrode belt-shaped sheet 3 as illustrated in FIG. 4.

Figure 5:
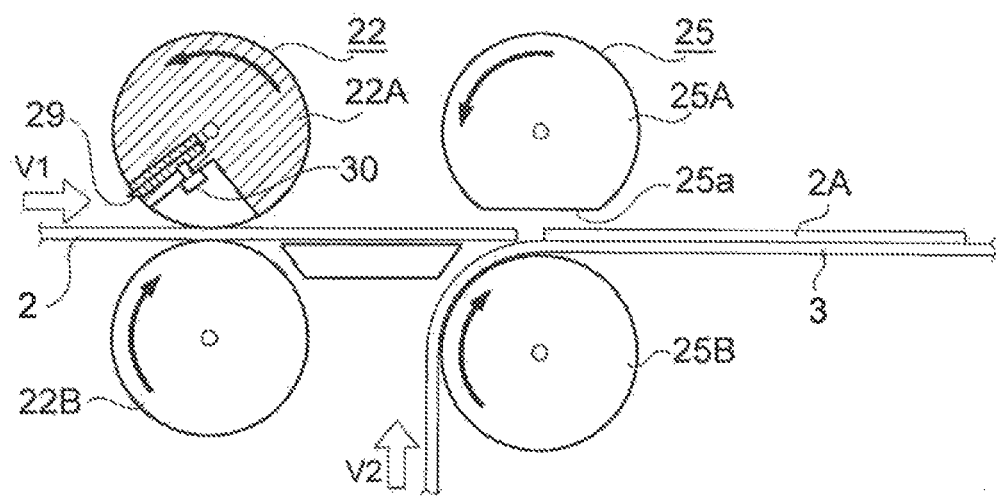
FIG. 5 is a schematic view illustrating configurations and operations of a first cutting roller and a clamp roller according to one embodiment.
Figure 6:
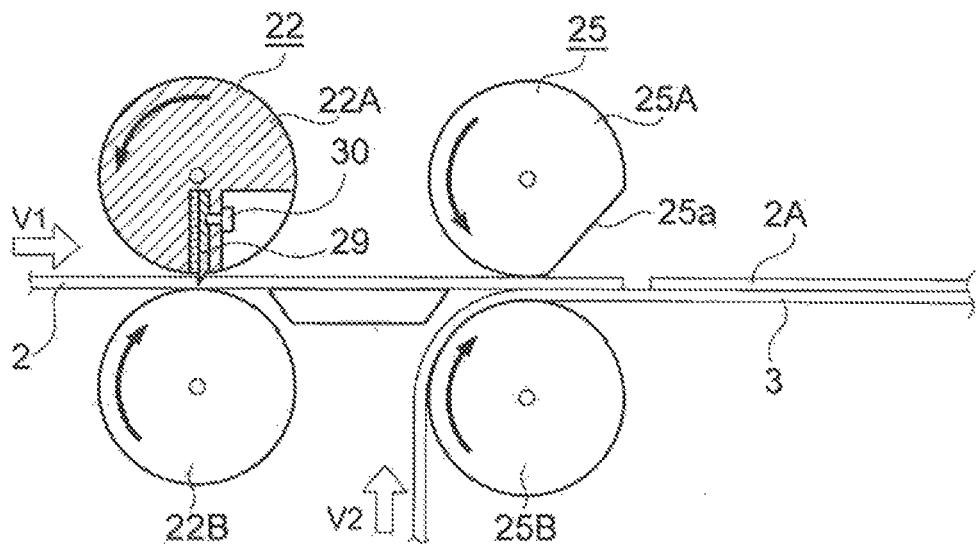
FIG. 6 is a schematic view illustrating the configurations and operations of the first cutting roller and the clamp roller according to one embodiment.
Figure 7:
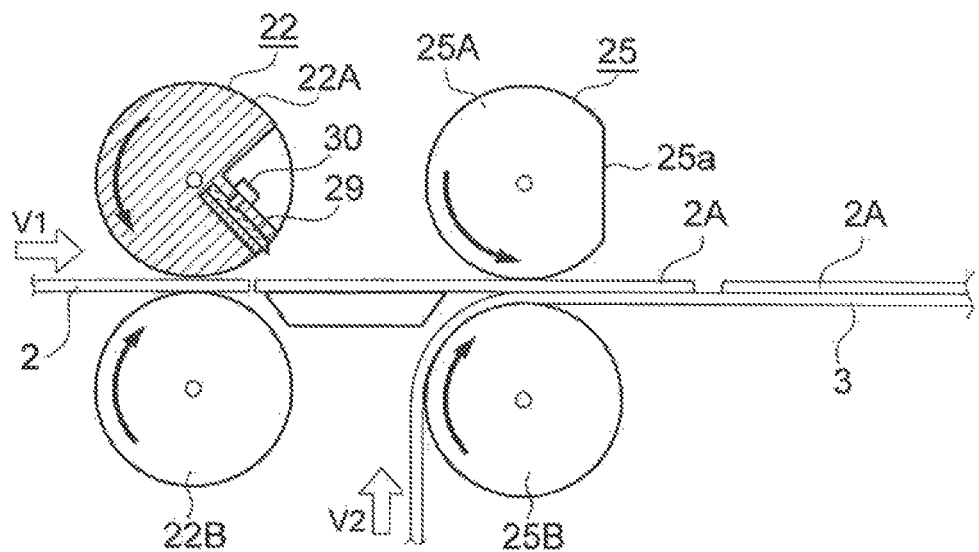
FIG. 7 is a schematic view illustrating the configurations and operations of the first cutting roller and the clamp roller according to one embodiment.

FIGS. 5 to 7 are schematic views illustrating configurations of the first cutting roller 22 and the clamp roller 25 and a series of operations thereof. As illustrated in FIG. 3 and FIGS. 5 to 7, the first cutting roller 22 includes a pair of rollers 22A, 22B and is driven by a motor (not shown). One roller 22A is provided with a cutting blade 29 configured to cut the positive-electrode belt-shaped sheet 2. As illustrated in FIGS. 5 to 7, the roller 22A is provided with an adjusting mechanism 30 including a screw thread and the like and configured to adjust a projecting dimension of a cutting edge of the cutting blade 29.

As illustrated in FIG. 3 and FIGS. 5 to 7, the clamp roller 25 includes a pair of rollers 25A, 25B and is driven by a motor (not shown). A cut portion 25a extending axially is formed on an outer periphery of one roller 25A. When the rollers 25A, 25B rotate, the rollers 25A, 25B are circumscribed with each other except for a part where the cut portion 25a is provided, so as to clamp the positive-electrode belt-shaped sheet 2 and the negative-electrode belt-shaped sheet 3 therebetween. Further, when the cut portion 25a of the one roller 25A is opposed to an outer periphery of the other roller 25B, the rollers 25A, 25B do not make contact with each other, so the positive-electrode belt-shaped sheet 2 and the negative-electrode belt-shaped sheet 3 are unclamped during the non-contact state.

As illustrated in FIG. 3, the second cutting roller 26 includes a pair of rollers 26A, 26B and is driven by a motor (not shown). One roller 26A is provided with a cutting blade 33 configured to cut the negative-electrode belt-shaped sheet 3. The configuration of the cutting blade 33 is the same as that of the cutting blade 29 of the first cutting roller 22.

As illustrated in FIG. 3, the third feed roller 27 includes a pair of rollers 27A, 27B and is driven by a motor (not shown). The housing rack 28 includes a plurality of (three, in this embodiment) racks 28a, 28b, 28c, and the racks 28a to 28c are configured to be opened only toward the third feed roller 27. The housing rack 28 is placed diagonally in a state where the housing rack 28 is opposed to the third feed roller 27, and is provided so as to reciprocate in a direction indicated by an arrow in FIG. 3 by a motor (not shown). The housing rack 28 is configured to accommodate non-defective sheet units 15 in the racks 28a, 28c on upper and lower sides, and to accommodate defective sheet units 15 in the central rack 28b.

In addition, as illustrated in FIG. 3, the manufacturing apparatus 20 is provided with a controller 50 for controlling the manufacturing apparatus 20, and various measurement devices 51 to 54. That is, a first edge sensor 51 configured to detect both side edges of the positive-electrode belt-shaped sheet 2 in a width direction is provided near the positive-electrode roll 12. Similarly, a second edge sensor 52 configured to detect both side edges of the negative-electrode belt-shaped sheet 3 in the width direction is provided near the negative-electrode roll 13. Further, a camera 53 configured to measure a position of the sheet unit 15 by an image is provided near the third feed roller 27. Similarly, a resistance meter 54 configured to measure an insulation resistance of the sheet unit 15 is provided near the third feed roller 27. The controller 50 is configured to control operations of various devices 12, 13, 21 to 28 based on predetermined control programs by receiving various signals measured by the measurement devices 51 to 54.

Figure 8:
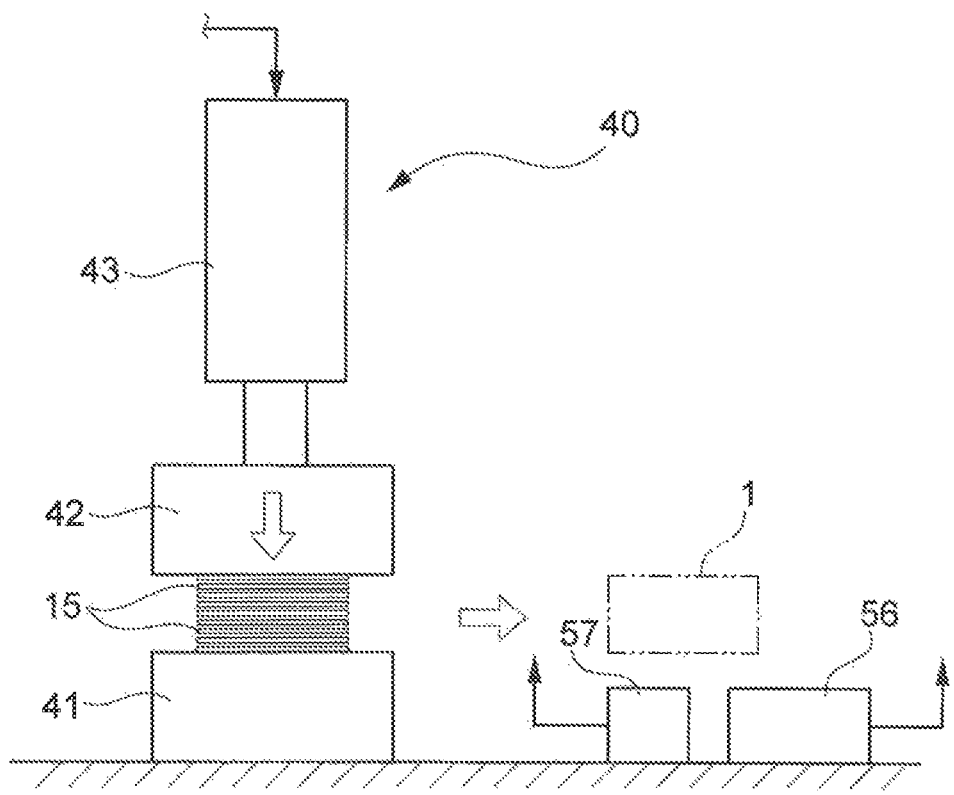
FIG. 8 is a schematic view illustrating a pressing machine and so on according to one embodiment.
Figure 9A:
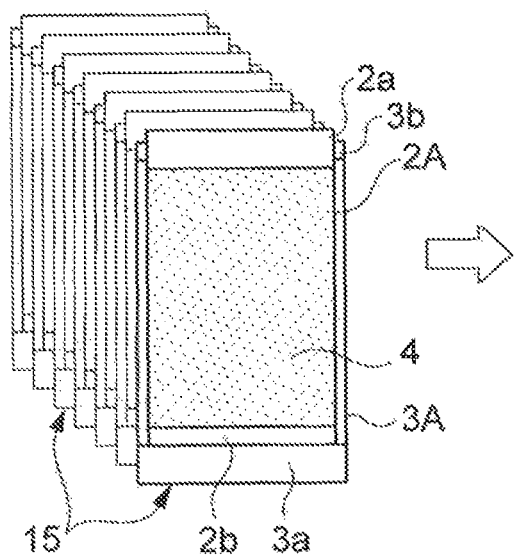
FIG. 9A is a perspective view illustrating a plurality of sheet units before pressing, according to one embodiment.
Figure 9B:
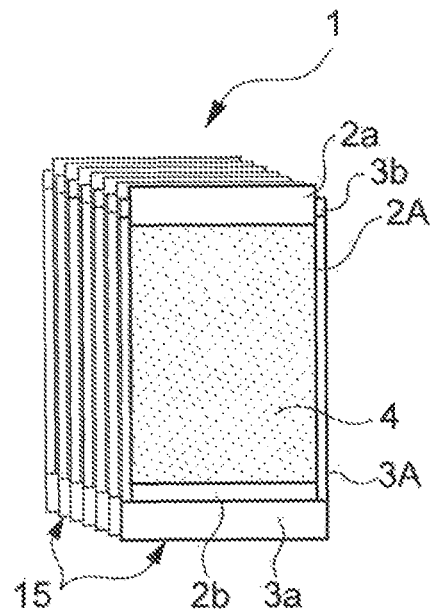
FIG. 9B is a perspective view illustrating a laminated electrode body obtained by the pressing.

The manufacturing apparatus 20 further includes a pressing machine configured to laminate and press a plurality of sheet units 15 accommodated in the racks 28a, 28c for good products in the housing rack 28. FIG. 8 is a schematic view illustrating the pressing machine 40 and so on. The pressing machine 40 includes: a fixed block 41 and a movable block 42 placed so as to be opposed to each other; and an air cylinder 43 configured to cause the movable block 42 to reciprocate toward the fixed block 41. A dimension measuring device 56 configured to measure a dimension (a thickness, a width, a height, and the like) of the laminated electrode body 1 pressed by the pressing machine 40, and a resistance meter 57 configured to measure an insulation resistance of the laminated electrode body 1 are provided near the pressing machine 40. The pressing machine 40, the dimension measuring device 56, and the resistance meter 57 are connected to the controller 50. FIG. 9A is a perspective view illustrating a plurality of sheet units 15 before pressing, and FIG. 9B is a perspective view illustrating the laminated electrode body 1 obtained by the pressing. The controller 50 is configured to perform good/bad determination on the laminated electrode body 1 based on measurement results of the dimension measuring device 56 and the resistance meter 57. A laminated electrode body 1 determined as a good product is sent to a subsequent step of manufacturing the battery 70, and a laminated electrode body 1 determined as a defective product is discharged and discarded.

Figure 10:
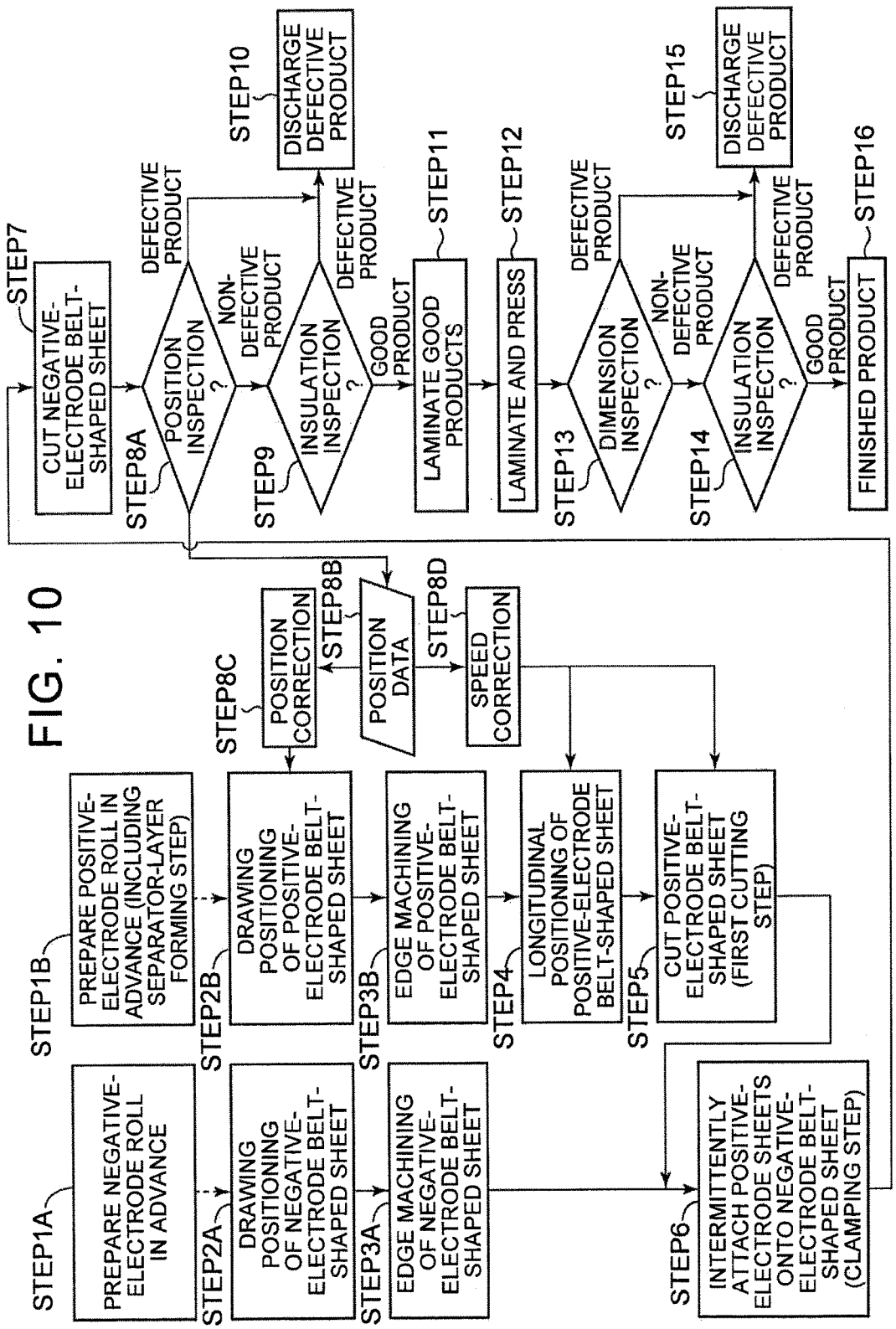
FIG. 10 is a flowchart illustrating a procedure of a manufacturing method of a laminated electrode body, according to one embodiment.

Next will be described the manufacturing method of the laminated electrode body 1 further more specifically. FIG. 10 illustrates a flowchart of a procedure of the manufacturing method.

In FIG. 10, first, in step 1A, a negative-electrode roll 13 is prepared in advance. Further, in step 1B, a positive-electrode roll 12 is prepared in advance. That is, in steps 1A, 1B, a negative-electrode belt-shaped sheet 3 and a positive-electrode belt-shaped sheet 2 are manufactured, and exposed portions 3a, 2a are formed in the negative-electrode belt-shaped sheet 3 and the positive-electrode belt-shaped sheet 2, respectively. Further, only the positive-electrode belt-shaped sheet 2 is subjected to a separator-layer forming step of forming a separator layer 4 on an electrode surface thereof. The negative-electrode belt-shaped sheet 3 thus manufactured and the positive-electrode belt-shaped sheet 2 thus manufactured are separately wound into a roll shape, and then attached to respective winding shafts 31, 32.

Then, in step 2A, the negative-electrode belt-shaped sheet 3 is drawn from the negative-electrode roll 13 and positioned. Further, in step 2B, the positive-electrode belt-shaped sheet 2 is drawn from the positive-electrode roll 12 and positioned. Here, the controller 50 adjusts target drawing positions of the positive-electrode belt-shaped sheet 2 and the negative-electrode belt-shaped sheet 3 by moving the winding shafts 31, 32 in the vertical direction to the plane of paper of FIG. 3.

Then, in step 3A, edge machining is performed on the negative-electrode belt-shaped sheet 3. Further, in step 3B, edge machining is performed on the positive-electrode belt-shaped sheet 2. The controller 50 controls the second feed roller 23 and the first feed roller 21 so as to form insulation portions 3b, 2b along respective edges of the negative-electrode belt-shaped sheet 3 and the positive-electrode belt-shaped sheet 2.

Subsequently, in step 4, a longitudinal position of the positive-electrode belt-shaped sheet 2 is determined. Here, the controller 50 controls the first and second feed rollers 21, 23, the clamp roller 25, and the first and second cutting rollers 22, 26, so as to control a first feed speed V1, which is a feed speed only for the positive-electrode belt-shaped sheet 2, a feed speed only for the negative-electrode belt-shaped sheet 3, and a second feed speed V2, which is a feed speed for the negative-electrode belt-shaped sheet 3 and the positive-electrode belt-shaped sheet 2 or the positive-electrode sheet 2A laminated on the negative-electrode belt-shaped sheet 3. In this embodiment, the controller 50 controls a feed speed by the first feed roller 21 and the first cutting roller 22 to the first feed speed V1, and also controls a feed speed by the second feed roller 23, the clamp roller 25, and the second cutting roller 26 to the second feed speed V2. Further, in this embodiment, there is a speed difference between the feed speeds V1, V2, and the controller 50 controls the speed difference so as to determine the longitudinal position of the positive-electrode belt-shaped sheet 2.

Subsequently, in step 5, the positive-electrode belt-shaped sheet 2 is cut. That is, a predetermined position on the positive-electrode belt-shaped sheet 2 is cut by the first cutting roller 22. This step can be regarded as a first cutting step of the present disclosure, and the positive-electrode belt-shaped sheet 2 is cut by the first cutting roller 22 at the predetermined position while the positive-electrode belt-shaped sheet 2 and the negative-electrode belt-shaped sheet 3 are continuously sent by the first feed roller 21 and the second feed roller 23. This step is performed in sync with the after-mentioned clamping step.

Subsequently, in step 6, positive-electrode sheets 2A thus cut are intermittently attached onto the negative-electrode belt-shaped sheet 3. That is, this step can be regarded as a clamping step of the present disclosure, and the positive-electrode belt-shaped sheet 2 is laminated on the uncut negative-electrode belt-shaped sheet 3 with the separator layer 4 being provided therebetween, and then clamped by the clamp roller 25 while being sent. In this embodiment, at the same timing as the clamping of the positive-electrode belt-shaped sheet 2 and the negative-electrode belt-shaped sheet 3 in step 6 (the clamping step), the cutting of the positive-electrode belt-shaped sheet 2 in step 5 (the first cutting step) is performed.

Subsequently, in step 7, the negative-electrode belt-shaped sheet 3 is cut. That is, a predetermined position on the negative-electrode belt-shaped sheet 3 is cut by the second cutting roller 26. This step can be regarded as a second cutting step of the present disclosure, and the uncut negative-electrode belt-shaped sheet 3 is cut at a cutting gap between the positive-electrode sheets 2A laminated on the uncut negative-electrode belt-shaped sheet 3, so as to obtain a sheet unit 15 including the positive-electrode sheet 2A and a negative-electrode sheet 3A attached to each other in a laminated manner.

Then, in step 8A, a position of the negative-electrode sheet 3A and the positive-electrode sheet 2A in the sheet unit 15 is inspected. The controller 50 recognizes a captured image of the camera 53, so as to inspect the position by comparing the position with a reference position. As a result of the position inspection, when the sheet unit 15 is determined as a defective product, the controller 50 process proceeds to step 10, but when the sheet unit 15 is determined as a non-defective product, the controller 50 proceeds to step 9.

Further, at the same time as step 8A, the controller 50 receives, in step 8B, position data of the position inspection in step 8A, and corrects the position in step 8C based on the position date. Then, the controller 50 reflects its correction result on processing in step 2B. That is, as for the positive-electrode belt-shaped sheet 2, a deviation from a reference value in terms of a feed direction and a direction perpendicular to the feed direction is fed back to drawing positioning of the positive-electrode belt-shaped sheet 2. Further, in step 8D, speed correction is performed based on the position date, and its correction result is reflected on processing in step 4 and step 5. That is, in terms of the positive-electrode belt-shaped sheet 2, a deviation of the feed direction from its reference value is fed back to the control of the speed difference in the longitudinal positioning of the positive-electrode belt-shaped sheet 2 and in the cutting of the positive-electrode belt-shaped sheet.

Here, in step 10, a defective product is discharged. That is, the controller 50 controls the housing rack 28 to accommodate a defective sheet unit 15 in the rack 28b for defective product.

Meanwhile, in step 9, in terms of a non-defective sheet unit 15, insulation between the negative-electrode sheet 3A and the positive-electrode sheet 2A is inspected. The controller 50 inspects the insulation by comparing a measurement result of the resistance meter 54 with a reference value. As a result of the insulation inspection, when the sheet unit 15 is determined as a good product, the controller 50 proceeds to step 11, but when the sheet unit 15 is determined as a detective product, the controller 50 proceeds to step 10 described above.

In step 11, non-defective sheet units 15 are laminated. That is, the controller 50 controls the housing rack 28 to accommodate a non-defective sheet unit 15 in the racks 28a, 28c for good products, and laminates the non-defective sheet unit 15 on other sheet units 15.

Here, a series of processing of step 8A to step 11 includes a lamination-shape determination step and a classification step in the present disclosure. That is, in the lamination-shape determination step, a lamination shape of the sheet units 15 is measured so as to determine good or bad of the lamination shape. Further, in the classification step, the sheet units 15 are classified into good products and defective products based on a good/bad determination result so as to be separately placed in the housing rack 28.

Subsequently, in step 12, laminating press is performed. That is, as illustrated in FIG. 8, a plurality of non-defective sheet units 15 is sandwiched between the fixed block 41 and the movable block 42 of the pressing machine 40, and the air cylinder 43 is operated to press the sheet units 15, so as to obtain a laminated electrode body 1.

Then, in step 13, a dimension of the laminated electrode body 1 is inspected. The controller 50 causes the dimension measuring device 56 to measure an outer-shape dimension such as a thickness, a width, a height, and the like of the laminated electrode body 1 thus obtained by pressing, so as to inspect the dimension by comparing the dimension with a reference value. As a result of the dimension inspection, when the laminated electrode body 1 is determined as a defective product, the controller 50 proceeds to step 15, but when the laminated electrode body 1 is determined as a good product, the controller 50 proceeds to step 14.

In step 15, the defective product is discharged. That is, the controller 50 discharges a defective laminated electrode body 1 from a line so as to discard the defective laminated electrode body 1.

Meanwhile, in step 14, as for a non-defective laminated electrode body 1, insulation between the negative-electrode sheet 3A and the positive-electrode sheet 2A is inspected. The controller 50 inspects the insulation by comparing a measurement result of the resistance meter 57 with a reference value. Further, as a result of the insulation inspection, when the laminated electrode body 1 is determined as a defective product, the controller 50 proceeds to step 15, but when the laminated electrode body 1 is determined as a good product, the controller 50 proceeds to step 16 in which the laminated electrode body 1 is obtained as a finished product.

Here, a combination operation of the first cutting roller 22 and the clamp roller 25 is described with reference to FIGS. 5 to 7. In a state illustrated in FIG. 5, the cutting blade 29 of the first cutting roller 22 is placed at a position where the positive-electrode belt-shaped sheet 2 has not been cut yet. The clamp roller 25 is placed such that the cut portion 25a of the one roller 25A is opposed to the outer periphery of the other roller 25B with a gap being provided between the rollers 25A, 25B. At this time, the clamp roller 25 causes an unclamped state in which the positive-electrode belt-shaped sheet 2 and the negative-electrode belt-shaped sheet 3 are unclamped before they are sent with a predetermined length. After that, as illustrated in FIG. 6, when the first cutting roller 22 and the clamp roller 25 further rotate, the cutting blade 29 of the first cutting roller 22 cuts the positive-electrode belt-shaped sheet 2 in half in its thickness direction, and in the clamp roller 25, the positive-electrode belt-shaped sheet 2 and the negative-electrode belt-shaped sheet 3 are stated to be clamped between the rollers 25A, 25B. After that, as illustrated in FIG. 7, when the first cutting roller 22 and the clamp roller 25 further rotate, the first cutting roller 22 sends the positive-electrode belt-shaped sheet 2 with the positive-electrode belt-shaped sheet 2 being sandwiched between the rollers 22A, 22B, and the clamp roller 25 further sends the cut positive-electrode sheet 2A and the negative-electrode belt-shaped sheet 3 with the positive-electrode sheet 2A and the negative-electrode belt-shaped sheet 3 being clamped between the rollers 25A, 25B.

Figure 11:
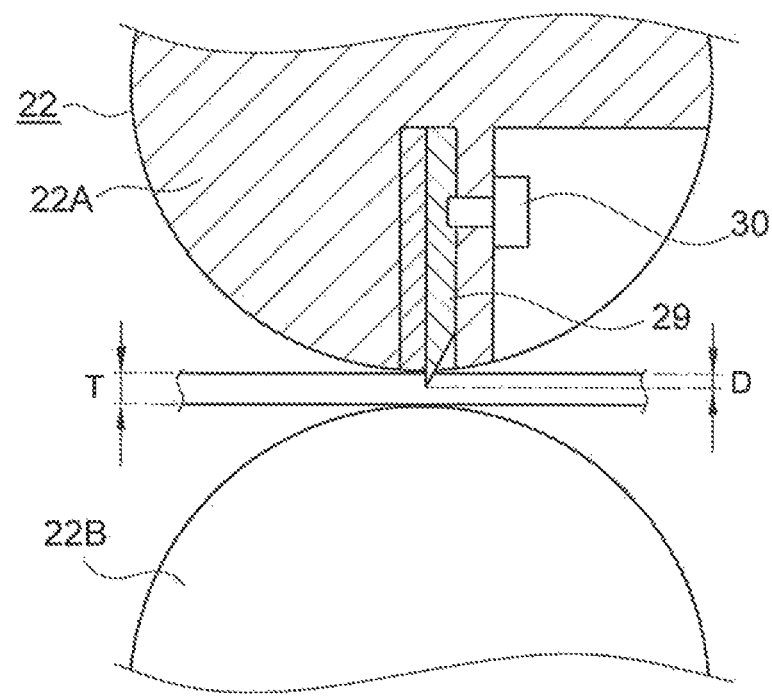
FIG. 11 is a schematic view illustrating part of FIG. 6 in an enlarged manner so as to show a relationship between the first cutting roller and the positive-electrode belt-shaped sheet, according to one embodiment.
Figure 12:
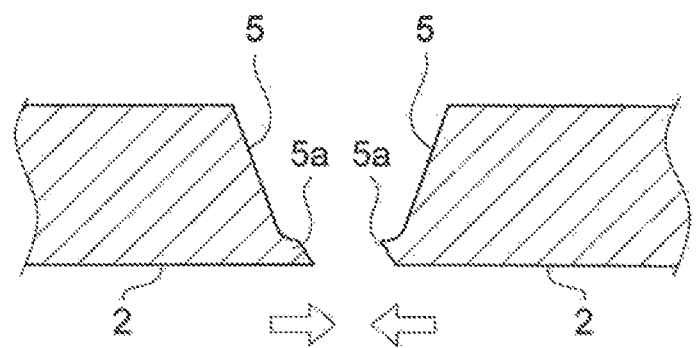
FIG. 12 is a sectional view illustrating a cutting pat of the positive-electrode belt-shaped sheet in an enlarged manner, according to one embodiment.

FIG. 11 is a schematic view illustrating part of FIG. 6 in an enlarged manner so as to show a relationship between the first cutting roller 22 and the positive-electrode belt-shaped sheet 2. FIG. 12 is a sectional view illustrating a cut part of the positive-electrode belt-shaped sheet 2 in an enlarged manner. In this embodiment, as illustrated in FIG. 11, when a thickness of the positive-electrode belt-shaped sheet 2 is indicated by "T" and a cutting depth of the positive-electrode belt-shaped sheet 2 by the cutting blade 29 is indicated by "D," a first cutting condition range is set to a relationship represented by Formula (A). Further, in FIG. 5 to FIG. 7, a second cutting condition range is set to a relationship represented by Formula (B) from the first feed speed V1 of the positive-electrode belt-shaped sheet 2 by the first cutting roller 22, and the second feed speed V2 of the negative-electrode belt-shaped sheet 3 and the positive-electrode sheet 2A by the clamp roller 25.

$$0.5T \leq D < 0.9T \quad (A)$$

$$1 < V2/V1 \leq 1.25 \quad (B)$$

Further, in this embodiment, at the time of a rotation of the clamp roller 25, the clamp roller 25 temporarily causes an unclamped state by the cut portion 25a of the one roller 25A, so as to absorb a speed difference (V2−V1) between the first feed speed V1 and the second feed speed V2.

Figure 13:
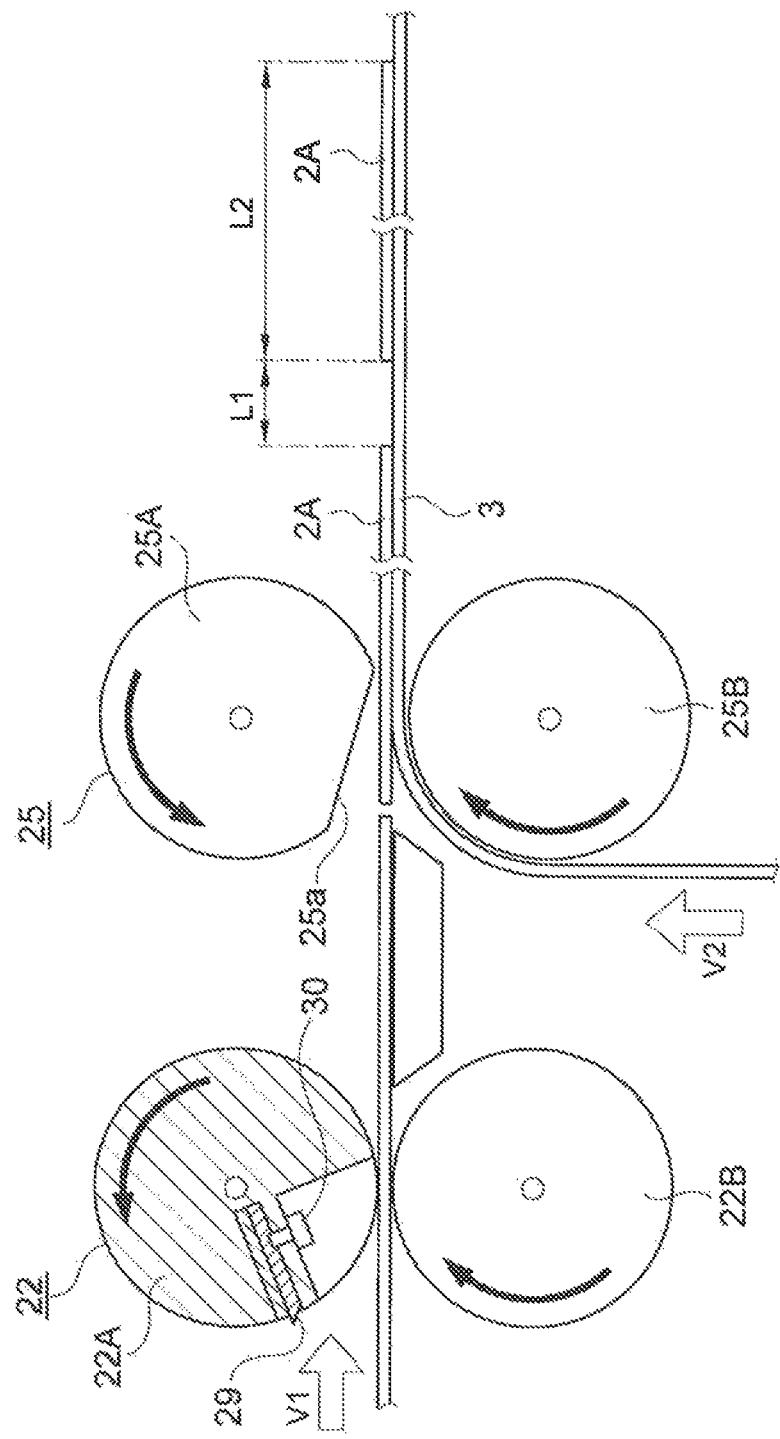
FIG. 13 is a schematic view illustrating a relationship between the first cutting roller, the clamp roller, the positive-electrode belt-shaped sheet, the negative-electrode belt-shaped sheet, and so on, according to one embodiment.

Here, "intermittent positioning" of the positive-electrode sheet 2A by the first cutting roller 22 and the clamp roller 25 is described. FIG. 13 is a schematic view illustrating a relationship between the first cutting roller 22, the clamp roller 25, the positive-electrode belt-shaped sheet 2, the negative-electrode belt-shaped sheet 3, and so on. In FIG. 13, when a gap (an intermittent length) between adjacent positive-electrode sheets 2A after having passed the clamp roller 25 is indicated by "L1" and a length of the positive-electrode sheet 2A is indicated by "L2," an intermittent positioning condition is represented by Formula (C) and Formula (D) as follows.

$$V2 > V1 \quad (C)$$

$$L2/(L1+L2) = V2/V1 \quad (D)$$

According to the manufacturing method of the laminated electrode body in this embodiment described above, the positive-electrode belt-shaped sheet 2 and the separator layer 4 are integrated in advance in the separator-layer forming step. Accordingly, when the positive-electrode sheet 2A is laminated on the negative-electrode sheet 3A, alignment of the positive-electrode sheet 2A and the negative-electrode sheet 3A with respect to the separator layer 4 is not required. Further, the sending of the positive-electrode belt-shaped sheet 2 and the negative-electrode belt-shaped sheet 3, the cutting of the positive-electrode belt-shaped sheet 2, the clamping of the cut positive-electrode sheet 2A and the uncut negative-electrode belt-shaped sheet 3, the cutting of the uncut negative-electrode belt-shaped sheet 3, and the lamination of the sheet units 15 are performed continuously without acceleration or deceleration. Accordingly, it is possible to efficiently laminate the positive-electrode sheet 2A on the negative-electrode sheet 3A with the separator layer 4 being provided therebetween while realizing speeding up, thereby making it possible to shorten a manufacturing time of the laminated electrode body 1.

In this embodiment, the first feed speed V1 by the first cutting roller 22 and the second feed speed V2 by the clamp roller 25 satisfy the relationship of Formula (B). Accordingly, due to a speed difference (V2−V1) between the first feed speed V1 and the second feed speed V2, the cutting is performed while a pulling force in the feed direction of the positive-electrode belt-shaped sheet 2 is applied to the cut part of the positive-electrode belt-shaped sheet 2. In this embodiment, since the second feed speed V2 by the clamp roller 25 is faster than the first feed speed V1 by the first cutting roller 22, the pulling force is applied to a half cut part of the positive-electrode belt-shaped sheet 2 due to the speed difference (V2−V1) so that the half cut part is divided in a front-rear direction. This makes it possible to restrain an occurrence of burr in a thickness direction on a cutting surface 5 (see FIG. 12) of the positive-electrode belt-shaped sheet 2.

The reason is as follows. As illustrated in FIG. 11, the cutting blade 29 cuts into part of the thickness of the positive-electrode belt-shaped sheet 2 in a state where the positive-electrode belt-shaped sheet 2 is sandwiched by the first cutting roller 22. Accordingly, a base material around the cut part is pulled in a right-left direction on the plane of paper, thereby restraining the occurrence of burr in a thickness direction of the positive-electrode belt-shaped sheet 2, namely, in the up-down direction on the plane of paper. Here, as illustrated in FIG. 11, the positive-electrode belt-shaped sheet 2 just becomes a half cutting state by the cutting blade 29, and the positive-electrode belt-shaped sheet 2 is not completely cut only by the cutting blade 29. Due to the speed difference (V2−V1) between the first feed speed V1 and the second feed speed V2 in addition to the half cutting state by the cutting blade 29, the pulling force is applied to the cut part, so that the positive-electrode belt-shaped sheet 2 is divided and completely cut. As a result, as illustrated in FIG. 12, a burr 5a caused on the cutting surface 5 of the positive-electrode belt-shaped sheet 2 is caused in an extended manner in the right-left direction on the plane of paper as indicated by arrows. On this account, even if the positive-electrode sheet 2A is laminated on the negative-electrode sheet 3A, the burr 5a does not damage the separator layer 4, thereby making it possible to increase resistance to a short circuit between a positive electrode and a negative electrode in the laminated electrode body 1 without losing an insulating property between the positive-electrode sheet 2A and the negative-electrode sheet 3A.

FIG. 14 is a graph showing a relationship between a cutting depth ratio (D/T) and a feed speed ratio (V2/V1) about good/bad cutting of the positive-electrode belt-shaped sheet 2. From this graph, it is found that good cutting is attained in a region with a cutting depth ratio (D/T) of "0.5 to 0.9" and a feed speed ratio (V2/V1) of "1.15 to 1.25."

In this embodiment, at the time of a rotation of the clamp roller 25, the clamp roller 25 temporarily causes an unclamped state by the cut portion 25a of the one roller 25A, so as to absorb the speed difference (V2−V1) between the first feed speed V1 and the second feed speed V2. Accordingly, the speed difference (V2−V1) does not cause an adverse effect on the sending and cutting of the positive-electrode belt-shaped sheet 2. This accordingly makes it possible to restrain a malfunction caused due to the speed difference (V2−V1), e.g., an occurrence of wrinkles in the positive-electrode sheet 2A at the time of the sending and cutting of the positive-electrode belt-shaped sheet 2.

Note that the present disclosure is not limited to the above embodiment, and the configuration can be partially modified as appropriate to be performed without deviating from the gist of the disclosure.

(1) In the embodiment, the separator layer 4 is formed in advance on the electrode surface of the positive-electrode belt-shaped sheet 2. However, the separator layer may be formed in advance on the electrode surface of the negative-electrode belt-shaped sheet, or the separator layer may be formed in advance on both electrode surfaces of the positive-electrode belt-shaped sheet and the negative-electrode belt-shaped sheet.

(2) In the embodiment, the positive-electrode belt-shaped sheet 2 is cut in the first cutting step, the cut positive-electrode sheet 2A is laminated on the uncut negative-electrode belt-shaped sheet 3 with the separator layer 4 being provided therebetween and clamped in the clamping step, and the uncut negative-electrode belt-shaped sheet 3 is cut at a cutting gap between the positive-electrode sheets 2A laminated on the uncut negative-electrode belt-shaped sheet 3 in the second cutting step, so as to obtain the sheet unit 15 including the positive-electrode sheet 2A and the negative-electrode sheet 3A provided in a laminated manner. Alternatively, a negative-electrode belt-shaped sheet may be cut in the first cutting step, a cut negative-electrode sheet may be laminated on an uncut positive-electrode belt-shaped sheet with a separator layer being provided therebetween and then clamped in the clamping step, and the uncut positive-electrode belt-shaped sheet may be cut at a cutting gap between negative-electrode sheets laminated on the uncut positive-electrode belt-shaped sheet in the second cutting step, so as to obtain a sheet unit including a positive-electrode sheet and the negative-electrode sheet provided in a laminated manner.

(3) In the embodiment, the cutting blades 29, 33 are respectively provided in the first cutting roller 22 and the second cutting roller 26, which are feed rollers, so as to cut the positive-electrode belt-shaped sheet 2 and the negative-electrode belt-shaped sheet 3. Alternatively, the positive-electrode belt-shaped sheet and the negative-electrode belt-shaped sheet may be cut by a cutting blade provided separately from the feed rollers.

(4) In the embodiment, at the time of cutting the positive-electrode belt-shaped sheet 2, the positive-electrode belt-shaped sheet 2 is in a half cutting state by the cutting blade 29 and a pulling force is applied to its cut part, so that the cut part is divided in the front-rear direction and cut completely. Alternatively, in a course of cutting the positive-electrode belt-shaped sheet by the cutting blade, the cut part may be divided in the front-rear direction by applying the pulling force to the cut part.

The present disclosure can be applied to manufacture of a battery such as a lithium-ion secondary battery or a nickel-hydrogen battery.

What is claimed is:

1. A manufacturing method of a laminated electrode body, comprising:
   forming a separator layer on an electrode surface of at least one of a positive-electrode belt-shaped sheet and a negative-electrode belt-shaped sheet;
   cutting either one of the positive-electrode belt-shaped sheet and the negative-electrode belt-shaped sheet so as to form a positive-electrode sheet or a negative-electrode sheet while continuously sending the either one of the positive-electrode belt-shaped sheet and the negative-electrode belt-shaped sheet by a feed roller;
   clamping and sending, by a clamp roller, the formed positive-electrode sheet or the formed negative-electrode sheet laminated, via the separator layer, on the other one of the negative-electrode belt-shaped sheet and the positive-electrode belt-shaped sheet, the other one of the negative-electrode belt-shaped sheet and the positive-electrode belt-shaped sheet being uncut;
   cutting the other one of the negative-electrode belt-shaped sheet and the positive-electrode belt-shaped sheet at a cutting gap formed between adjacent positive-electrode sheets or negative-electrode sheets laminated on the other one of the negative-electrode belt-shaped sheet and the positive-electrode belt-shaped sheet, so as to obtain a sheet unit including the positive-electrode sheet and the negative-electrode sheet;
   measuring a lamination shape of the sheet unit so as to determine good or bad of the lamination shape;
   classifying the sheet unit into a good product when it is determined that the lamination shape of the sheet unit is good and classifying the sheet unit into a defective product when it is determined that the lamination shape of the sheet unit is bad; and
   laminating and pressing a plurality of sheet units determined as the good product, so as to obtain a laminated electrode body,
   wherein the either one of the positive-electrode belt-shaped sheet and the negative-electrode belt-shaped sheet is cut while the either one of the positive-electrode belt-shaped sheet and the negative-electrode belt-shaped sheet is clamped.

2. The manufacturing method according to claim 1, wherein
   the either one of the positive-electrode belt-shaped sheet and the negative-electrode belt-shaped sheet is cut by a cutting blade provided in the feed roller; and
   when a first feed speed by the feed roller is indicated by V1 and a second feed speed by the clamp roller is indicated by V2, V1 and V2 satisfy a relationship represented by the following Formula (1) as follows $$1 < V2/V1 \leq 1.25 \tag{1}.$$

3. The manufacturing method according to claim 2, wherein
   the clamp roller includes first and second rollers making contact with each other;
   a cut portion axially extending is formed on an outer periphery of the first roller; and
   when the clamp roller is rotated, the clamp roller temporarily causes an unclamped state by the cut portion of the first roller, so as to absorb a speed difference between the first feed speed and the second feed speed.

\* \* \* \* \*